(12) United States Patent
Kubota et al.

(10) Patent No.: US 7,713,563 B2
(45) Date of Patent: May 11, 2010

(54) METHOD FOR PRODUCING GOOD-FLAVOR BUTTER MILK ASSOCIATED DAIRY PRODUCT AND DAIRY PROCESSED PRODUCT

(75) Inventors: Yasushi Kubota, Odawara (JP); Yukinari Takeuchi, Odawara (JP); Satoshi Hayashi, Odawara (JP); Naoki Orii, Odawara (JP); Tadashi Nakatsubo, Odawara (JP)

(73) Assignee: Meiji Dairies Corporation, Tokyo (JP)

( * ) Notice: Subject to any disclaimer, the term of this patent is extended or adjusted under 35 U.S.C. 154(b) by 831 days.

(21) Appl. No.: 10/538,298

(22) PCT Filed: Dec. 10, 2003

(86) PCT No.: PCT/JP03/15811

§ 371 (c)(1),
(2), (4) Date: Jun. 10, 2005

(87) PCT Pub. No.: WO2004/052113

PCT Pub. Date: Jun. 24, 2004

(65) Prior Publication Data

US 2006/0057271 A1    Mar. 16, 2006

(30) Foreign Application Priority Data

Dec. 10, 2002   (JP) .............................. 2002-357515

(51) Int. Cl.
  *A23C 9/00*   (2006.01)
(52) U.S. Cl. .................. 426/580; 426/474; 426/520; 426/581; 426/586
(58) Field of Classification Search ............ 426/474, 426/520, 521, 522, 580, 581, 586, 663, 664
See application file for complete search history.

(56) References Cited

U.S. PATENT DOCUMENTS 2,279,106 A   4/1942   Brown

FOREIGN PATENT DOCUMENTS

| DE | 29 13 242 A1 | 11/1980 |
|---|---|---|
| EP | 1 082 907 A1 | 3/2001 |
| JP | 7-236451 A | 9/1995 |
| JP | 9-266757 A | 10/1997 |
| JP | 10-295341 A | 11/1998 |
| JP | 3091752 B1 | 9/2000 |
| JP | 2003-144045 A | 5/2003 |
| SU | 512753 | 5/1976 |

OTHER PUBLICATIONS

Supplementary European Search Report dated May 9, 2006.
Hiroya Ishikawa, 2Ea5: Kanetsu Sakkinji no Yozonsansonodo ga Gyunyu no Fumi ni Ataeru Eikiyo (2) (Influence of Dissolved Oxygen Concentration in Heat Sterilization on the Taste of Cow's Milk (2)), Papers Presented at the 49th Meeting of Japanese Society for Food Science and Technology, p. 123, Aug. 29, 2002.
Yukinari Takeuchi, 2Ea4: Kanetsu Sakkinji no Yozonsansonodo ga Gyunyu no Fumi ni Ataeru Eikyo (1) (Influence of Dissolved Oxygen Concentration in Heat Sterilization on the Taste of Cow's Milk (1)),Papers Presented at the 49th Meeting of Japanese Society for Food Science and Technology, p. 122, Aug. 29, 2002.
Japanese Office Action dated Sep. 22, 2008.

*Primary Examiner*—Leslie Wong
(74) *Attorney, Agent, or Firm*—Sughrue Mion, PLLC

(57)   ABSTRACT

A process for preparing butter milk and/or butter serum, which comprises decreasing the dissolved oxygen concentration of at least one selected from the group consisting of milk, a milk product, butter milk and butter serum, followed by heating, and optionally fractionizing the heated product.

8 Claims, 5 Drawing Sheets

METHOD FOR PRODUCING GOOD-FLAVOR BUTTER MILK ASSOCIATED DAIRY PRODUCT AND DAIRY PROCESSED PRODUCT

This application is a 371 of PCT/JP03/15811, filed Dec. 10, 2003.

FIELD OF THE INVENTION

This invention provides a production process capable of improving flavor, physical properties and shelf life of butter milk-related dairy products and processed milk products, which have hardly been used as food materials in Japan because, in spite of their excellent characteristics such as high nutritive values, various physiological functions and reinforcement of milk flavor of food, they undergo oxidation mainly due to dissolved oxygen from the air which quickly generates unpleasant taste and smell, and also provides butter milk-related dairy products, processed milk products and the like having good flavor which are obtained by this production process.

BACKGROUND ART

Both butter milk and butter serum are pale yellow liquids which are generated as by-products together with the butter and butter oil of interest in producing butter from cream prepared to a milk fat content of from 30 to 40% in the former case, and in producing butter oil from butter or high fat cream in the latter case, by a physical fractionation operation such as centrifugation which makes use of the difference in specific gravity or demulsification represented by churning effected by the collision of milk fat globules. By further concentrating or drying (butter milk powder) these liquids, various types of butter milk-related dairy products and processed milk products are produced. In Europe and America, butter milk is also produced when fermented butter is produced, after fermenting cream by inoculating a lactic acid bacterium, and this is generally called acidic butter milk. On the other hand, a product by a process without fermentation is called sweet butter milk. Objects of the present invention do not distinguish kinds of sweet and acidic butter milks. Also, though butter milk and butter serum are distinguished based on the difference of the dairy products used in their production, basic differences are not found in terms of their milk components, physical properties and the like, so that butter serum is regarded in the present invention as a part of butter milk in a broad sense (hereinafter, the term butter milk sometimes includes butter serum).

It is said that butter milk contains lipids, proteins, carbohydrates, minerals, vitamins and the like similar to the case of milk, and its nutritive value per solid matter is almost the same as that of milk. However, as can be understood from its production method, it is characterized by the presence of a large amount of milk fat globule membrane substance constituting the interface of milk fat globules, and it is known that milk fat globule membrane substance-characteristic lipoproteins and glycoproteins are present as the membrane proteins, in addition to casein, α-lactalbumin and β-lactoglobulin. Also, it is said that it contains a large amount of phospholipids which are generally referred to as lecithin, in addition to the general triglycerides (neutral lipids) as the membrane constituting lipids, occupying from 29 to 36% of the milk fat globule membrane substance. The main phospholipids are phosphatidylcholine, sphingomyelin and phosphatidylethanolamine, and when compared with lecithin derived from a plant such as soybean, the milk lecithin is particularly characterized by the presence of sphingomyelin in a considerably large amount of approximately 18%, which is close to the composition of human milk lecithin, so that its nutritional application value is considered to be markedly high.

In addition, since butter milk richly contains aromatic components which are characteristic to butter, it is a desirable material from the viewpoint of flavor, too. The aromatic components are composed of ketones, fatty acids, lactones and the like, and are particularly characterized in that ketones are contained in an overwhelmingly large amount of 78% even when compared with other dairy products.

On the other hand, it is said that butter milk is also effective for the treatment of acute hepatitis and gastric mucosal sepsis and the prevention of diarrhea of babies. It is also considered that it has a blood pressure reducing activity and serum cholesterol reducing activity.

Thus, in spite of the excellent characteristics such as high nutritive value, various physiological functions and reinforcement of milk flavor of food, the application of butter milk as a food material has hardly been developed, because it is apt to undergo oxidation due to the dissolved oxygen from the air which quickly generates unpleasant taste and smell. Currently in Japan, butter milk generated during the production of butter is mostly discarded without any application, which must be regarded as a serious loss of a food resource.

Two methods are known for effecting long-term storage of butter milk, namely (1) a method in which the number of microorganisms in the generated butter milk is controlled to a predetermined level or less by a batch or plate heating treatment, and the resulting butter milk is concentrated under a reduced pressure using an evaporator, subjected to final sterilization and then frozen to obtain a butter milk concentrate and (2) a method in which the butter milk concentrate obtained in (1) by concentrating under a reduced pressure using an evaporator is made into powder using a spray drying apparatus (dryer). Since butter milk is highly concentrated in either method, the produced butter milk-related diary products are apt to undergo oxidation by oxygen in the air, considerably strongly, so that in order to avoid this, each product is generally packed in a can or an aluminum foil-lined polyethylene processed paper container and stored in a cool and dark place. However, even when it is stored in a cool and dark place using these sealed containers, foul taste and smell due to generation of oxidized products becomes strong within approximately 1 to 3 months, or within about 1 week after opening of the container, so that the shelf life is considerably poor and its application value as a food processing material (e.g., "Nyuseihin Kogyo (Dairy Products Industry), the second volume", published on Feb. 25, 1972, pp. 223-224, edited by Tomokichi Tsugo, published by Chikyu Shuppan) is low.

In addition, by taking note of the fact that butter milk contains milk fat globule membrane substance in a large amount, it has been reported on a method in which the fat globule membrane substance is fractionated and purified from butter milk and used as a food flavor improving agent (JP-A-7-236451) and a method in which the milk fat globules are removed from butter milk by centrifugation and then the ultrafiltration vitrification liquid is used as a food flavor improving agent (Japanese Patent No. 3004912). However, each of these methods is a technique related to the fractionation and purification of the milk fat globule membrane substance in butter milk, and it is evident that this technique is basically different from the technique of the present invention which is intended to prevent generation of oxidized smell caused by undergoing influence of the oxidation based on the dissolution of air oxygen in butter milk, thereby keeping and improving the milky flavor inherent to the butter milk. In addition, although the degree of flavor may vary, as will be described later, generation of oxidized smell of the flavor improving agents obtained by these techniques cannot be avoided, so long as a heat treatment is carried out in the presence of unsaturated fatty acids and milk proteins.

In the field of dairy industry, a process has been reported in which a drink having a flavor close to crude milk or unheated solution of milk is produced by carrying out heat treatment of milk or a milk-containing unheated solution after reducing dissolved oxygen in the liquid prior to their heat treatment (JP-A-10-295341), and also a sterilization method which does not generate heated smell, as a method for sterilizing milk and the like by replacing dissolved oxygen therein with nitrogen gas, in which sterilization is carried out after reducing amount of dissolved oxygen in milk and the like by replacing dissolved oxygen by nitrogen gas, effected by the combined use of a means wherein nitrogen gas is directly mixed and dispersed in milk and the like and a means wherein milk and the like which are not contaminated with nitrogen gas are sprayed from the upper side through a nozzle to nitrogen gas-mixed and dispersed milk and the like stored in a nitrogen gas-replaced tank under a nitrogen gas atmosphere (Japanese Patent No. 3091752). However, the objects of these methods for keeping and improving flavor are milks of cow, horse, goat, sheep, water buffalo, human and the like mammals, and products containing these milks, such as milk based drinks, processed milk, fortified or separated milk beverages, reduced milk, fermented milk, lactic acid bacteria beverage, fresh cream, fruit juice drink and the like, but nothing is reported therein about the butter milk which undergoes influence of the oxidation by oxygen in the air considerably strongly as described in the foregoing.

DISCLOSURE OF THE INVENTION

An object of the present invention is to extremely extend the use of application of butter milk-related dairy products and processed milk products in the food industry, by preventing generation of oxidized smell from these butter milk-related dairy products and processed milk products caused by the influence of oxidation based on the dissolution of oxygen in the air, and thereby keeping and improving the milky flavor inherent to the butter milk, and also to overcome a technical problem for total recovery of butter milk which previously had to be discarded, and thereby to achieve the effective utilization of food resources or the reduction of risk of environmental pollution caused by the abandonment of food resources.

The present invention has been made with the aim of achieving the above object, and inventors of the present invention have found as a result of investigations from various angles that butter milk and/or butter serum which hardly generates oxidized flavor, and when it is drunk, characteristic to crude milk, palatable, having refreshing after-taste and completely lacking unpleasant or foul taste and smell can be obtained by employing a method in which, during a process of fractionating and preparing a partial or entire amount of butter milk and/or butter serum from milk and/or a dairy product, when applying a heat treatment to solution of milk and/or a diary product before the fractionation and preparation (in general, cream is used at the time of producing butter milk, and heating-dissolved butter at the time of producing butter serum), and/or butter milk and/or butter serum after the fractionation and preparation, which is carried out for the purpose of sterilizing these solutions and/or keeping and improving flavor thereof and/or preventing deterioration of their physical properties, dissolved oxygen concentration in the solution is reduced in advance (to 8 ppm or less, preferably 5 ppm or less, more preferably 2 ppm or less) by injection of an inert gas or the like.

Also, a concentrated preparation obtained by concentrating deoxidation-treated butter milk and/or butter serum under a reduced pressure using an evaporator and a powder obtained by drying and disintegrating this using a dryer can also be made into products which hardly generate oxidized smell, have good taste and refreshing after-taste and completely lack in foul taste and smell in comparison with deoxidation-untreated concentrate and powder.

In addition, when production of new dairy products and processed milk products was carried out for the purpose of improving flavor by partial addition of these butter milk-related dairy products to other milks and/or dairy products, the butter milk-inherent oxidized smell was hardly felt and it was able to obtain products having stronger milky flavor than usual diary products.

When application of the butter milk-related diary products and processed milk products obtained in this manner by a deoxidation operation to food and drink was verified, the finally obtained food and drink hardly generated the butter milk-inherent oxidized smell, and showed strong milky flavor, good taste and refreshing after-taste, so that it was able to verify the usefulness of the present invention.

The present invention relates to the following (1) to (10).

(1) A process for preparing butter milk and/or butter serum, which comprises decreasing the dissolved oxygen concentration of at least one selected from the group consisting of milk, a milk product, butter milk and butter serum, followed by heating, and optionally fractionizing the heated product.

(2) The process according to (1), wherein the dissolved oxygen concentration is decreased by addition of inactive gas.

(3) The process according to (2), wherein the inactive gas is nitrogen gas.

(4) The process according to any one of (1) to (3), wherein the dissolved oxygen concentration is 8 ppm or less.

(5) The process according to any one of (1) to (4), wherein the dissolved oxygen concentration is 5 ppm or less.

(6) The process according to any one of (1) to (5), wherein the dissolved oxygen concentration is 2 ppm or less.

(7) A process for preparing a butter milk-related dairy product and/or processed milk product, which comprises subjecting the butter milk and/or butter serum prepared by the process according to any one of (1) to (6) to at least one processing selected from the group consisting of concentration, drying, fractionation, purification, deodorizing, decoloring and addition of an additive.

(8) A process for preparing a milk product or processed milk product, which comprises adding at least one selected from the group consisting of the butter milk, the butter serum, the milk product and the processed milk product prepared by the process according to any one of (1) to (7) to another milk and/or milk product.

(9) A process for preparing food or drink, which comprises using, as an addition material, at least one selected from the group consisting of the butter milk, the butter serum, the milk product and the processed milk product prepared by the process according to any one of (1) to (8).

(10) Butter milk, butter serum, a milk product, a processed milk product, food or drink, prepared by the process according to any one of (1) to (9).

BEST MODE FOR CARRYING OUT THE INVENTION

Figure 1:
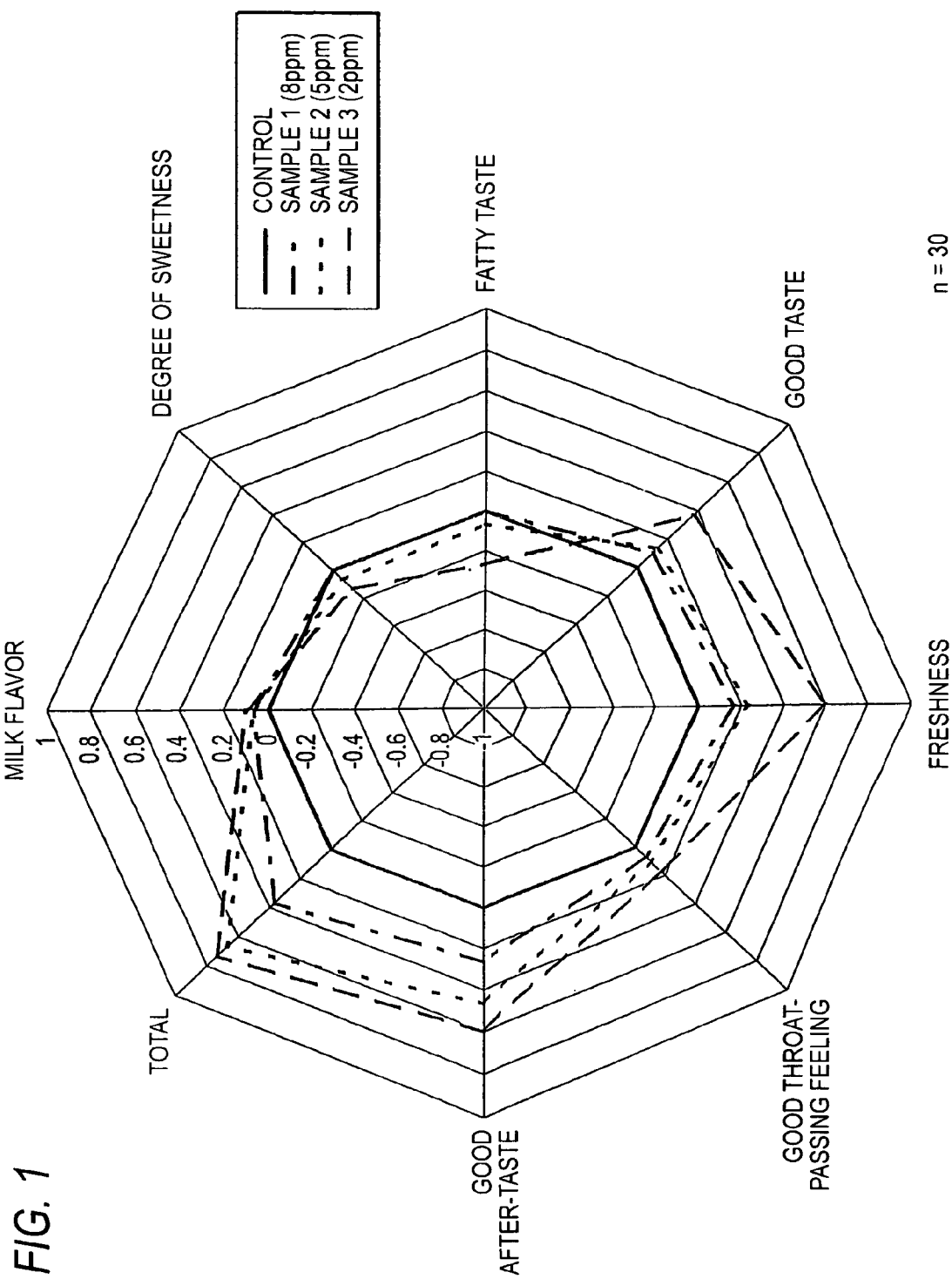
FIG. 1 is a graph showing a result of sensory evaluation of a butter cream after re-heat sterilization of a butter milk produced from a cream after heat-sterilizing the cream under the condition of reducing dissolved oxygen to 8, 5 or 2 ppm.

The present invention is described in the following in detail.

According to the present invention, the milk to be used as the origin of butter milk and/or butter serum is not particularly limited, so long as it is a mammalian milk, and examples include cow milk, goat milk, sheep milk, water buffalo milk, sow milk, human milk and the like.

The milk and/or diary products to be used in producing butter milk and/or butter serum include crude milk, milk, special milk, partially defatted milk, whole milk powder, concentrated milk, evaporated milk, cream, butter and the like. Among these, cream and butter are generally used industrially in view of the yield and productivity, so that example of the use of cream and butter is described in the following. However, the present invention does not exclude the use of milks and/or dairy products other than the cream and butter.

In general, a cream adjusted to a milk fat content of from 30 to 40% is heated by a plate heat exchanger under a sterilization condition of from 85 to 95° C., and then cooled down to about 5° C. and subjected to aging in a storing liquid tank. Next, butter and butter milk are obtained by carrying out churning (an operation in which milk fat globule membrane substance is freed into water phase and butter particles are formed, by destroying the interface structure of milk fat globule through the collision of milk fat globules) at a temperature of from 7 to 13° C. using a batch type butter churn, continuous butter churn or the like. The thus obtained butter milk is again sterilized and transferred for concentration under a reduced pressure using an evaporator. It was considered that since the butter milk is subjected to heat treatment at least twice before and after its separation in this manner, the heated smell is generated by the rapidly progressing oxidation reaction due to oxygen in the air dissolving in the butter milk.

It is a well known fact that milk components including butter milk cause denaturation of milk proteins by heating and thereby generate heat related unpleasant smell components represented by sulfur compounds such as hydrogen sulfide, dimethyl sulfide (to be referred to as DMS hereinafter), dimethyl disulfide (to be referred to as DMDS hereinafter), dimethyl trisulfide (to be referred to as DMTS hereinafter) and the like. That is, milk proteins (particularly whey proteins represented by β-lactoglobulin) undergo thermal denaturation by heating, and disulfide bonds in sulfur-containing amino acid residues in polypeptide chains are cleaved to expose —SH groups. On the other hand, the dissolved oxygen reacts with unsaturated fatty acids to form radicalized lipid peroxides. The radicalized lipid peroxides are said to react with the —SH groups in the polypeptide chains of milk proteins to form various sulfur oxides which are detected as the heat related unpleasant smell components.

The lipids contained in milk (milk fats) are generally from 3.5 to 4.0%, and the constituting fatty acids broadly vary from butyric acid ($C_{4:0}$) to linolenic acid ($C_{18:3}$). Among these, it is considered that unsaturated fatty acids are particularly richly contained in the milk fat globule membrane substance in butter milk, and it is considered that the constituting neutral lipids and phospholipids contain from 2 to 4% of palmitoleic acid, from 11 to 36% of oleic acid and from 2 to 11% of linoleic acid as unsaturated fatty acids, so that among the milk components, they are particularly apt to be influenced by oxidation due to dissolved oxygen.

Accordingly, taking into consideration that this rapid progress in the oxidation by oxygen in the air becomes a cause of the generation of heated smell, an investigation was carried out on the process for reducing dissolved oxygen in a material cream by a deoxidation operation before the preparation of butter milk. As typical methods, two methods, namely ultrasonic treatment of the cream and replacement of the atmosphere in the cream by its sealing with an inert gas (nitrogen, argon or the like), were considered. As a result, the ultrasonic treatment could not withstand industrial production, because the interface structure of milk fat globules in the cream was destroyed before heating sterilization, thereby causing changes in physical properties such as the viscosity increase and aggregation, while the sealing of an inert gas in the cream did not show particular changes in the physical properties and changes in the physical properties were not observed also by the subsequent heat sterilization. Therefore, it is considered that the latter method is a deoxidation operation most suited for the present invention.

In the case that an inert gas (hereinafter, the present invention is described using nitrogen gas as a typical example) is sealed, it is desirable that the sealing is carried out in a cream-stored tank and/or in lines reaching to a heating machine and at a liquid temperature of 90° C. or less, preferably from 80 to 85° C. or less. However, since degassing of the sealed nitrogen gas becomes difficult in the case of a cream of 30° C. or less, it is most suitable to carry out it in accordance with the usual butter milk production method, by setting temperature of the cream to from 30 to 40° C.

In general, concentration of dissolved oxygen in cream before the deoxidation treatment is approximately from 10 to 15 ppm. When dissolved oxygen concentration in the cream is reduced to 8 ppm or less by applying the aforementioned deoxidation operation, and butter milk is prepared after carrying out its heat sterilization at 85 to 95° C., oxidized smell of the product becomes weak, and the crude milk-specific good taste and refreshing after-taste are expressed when compared with the usual deoxidation-untreated butter milk. Particularly, this tendency becomes significant when the dissolved oxygen concentration is reduced to 5 ppm or less, and the oxidized smell becomes hardly recognizable when reduced to 2 ppm or less.

On the other hand, when a butter milk fractionated without carrying out the deoxidation treatment of cream after its heat sterilization at 85 to 95° C., or directly without carrying out heat sterilization, was subjected to the deoxidation operation by nitrogen gas sealing and to the subsequent final heating at a temperature of from 85 to 130° C., the oxidized smell became weak and the crude milk-specific good taste and refreshing after-taste were expressed when dissolved oxygen concentration in the butter milk was reduced to 8 ppm or less. Particularly, this tendency became strong when the dissolved oxygen concentration was reduced to 5 ppm or less, and the oxidized smell became hardly recognizable when reduced to 2 ppm or less. However, its predominance in terms of flavor became slightly weak in comparison with a case when the cream as the starting material of butter milk was subjected to the deoxidation operation.

In both cases, the minimum dissolved oxygen concentration in the cream is not particularly limited, and it is 0 ppm or more.

With regard to a nitrogen substitution apparatus for industrially carrying out the deoxidation operation, it has been invented by inventors of the present invention (aforementioned Japanese Patent No. 3091752) and put into practical use. Accordingly, the present invention is a technique which can be carried out at once and is markedly profitable for the food industry.

In the case that concentration of the butter milk and/or butter serum obtained by the present invention is carried out for the purpose of increasing the solid content, a method such as concentration under a reduced pressure by an evaporator such as a triple efficiency concentrator, or freeze concentration by a Glenco type freeze-concentrator or the like, is employed. In the case of the concentration under a reduced pressure by an evaporator, it is possible to concentrate to a solid content of about 40% similar to the case of the usual butter milk concentrate employing no deoxidation operation. Also, it is possible to obtain a butter milk powder from this butter milk concentrate in the usual way by heating it at 60 to 70° C. and then drying it with hot air of from 130 to 200° C. using a dryer. The butter milk concentrate and buttermilk powder obtained in this manner have excellent flavor, hardly generating oxidized smell, having good taste and refreshing after-taste and lacking in unpleasant or foul taste and smell, in comparison with deoxidation-untreated concentrate and powder. In addition, the obtained butter milk-related dairy products show excellent shelf life in sealed containers.

These butter milk-related dairy products are directly used as food materials in many cases. However, there are cases in which useful food processing materials are produced from them by carrying out processing such as fractionation, purification, deodorization, decolorization, addition of additives and the like. An example is purification of milk fat globule membrane substance-derived lecithin richly contained in butter milk. In this case, crude lecithin is prepared from butter milk by aqueous alcohol extraction and subsequent acetone extraction, and then purified lecithin is obtained through the steps of water washing, sterilization and drying, and this process has been put into practical use. In this connection, when a deoxidation-treated butter milk is used, generation of an oxidized smell, called lecithin smell, is inhibited so that excellent flavor is obtained.

The butter milk-related diary products and processed milk products thus described in the foregoing have large effect to add milky flavor to food and drink. They are broadly used in such applications as milk beverage, soft drink, fresh cream, compound cream, fermented milk, lactic acid bacteria beverage, fermented cream, dessert, ice cream, cheese, butter, margarine, bread, side dishes and the like, and the present invention can be applied to all food and drink.

EXAMPLES

The present invention is described in the following with examples, but the present invention is not limited thereto.

Example 1

Into a tank, 2,000 kg of raw milk (milk fat content 3.8%, fat-free milk solid content 8.6%) was poured and heated up to 45° C., and then 180 kg of fresh cream having a milk fat content of 40% and a fat-free milk solid content of 5.4% was separated by centrifugation using a cream separator and immediately cooled down to 5° C. with chilled water.

After 35 kg of the fresh cream was taken out and adjusted to its temperature to 40° C., a heat sterilization was carried out at 95° C. for 15 seconds using an UHT/HTST dual purpose small plate type sterilization testing machine (flow rate 150 L/hr; manufactured by Iwai Kikai), directly without sealing nitrogen gas, and then cooled down to 5° C. The thus obtained cream weight was 20 kg (control cream).

After 35 kg of the fresh cream was taken out and adjusted to its temperature to 40° C., nitrogen gas was sealed therein in such an amount that dissolved oxygen became 8, 4 or 2 ppm. After allowing it to stand as such for about 10 minutes and confirming that degassing was completed, its heat sterilization was carried out at 95° C. for 15 seconds using the plate type sterilization testing machine and then cooled to 5° C. The thus obtained cream weight was 20 kg (samples 1, 2 and 3). In this case, the dissolved oxygen concentration was measured using a dissolved oxygen meter (Type DO-21P; manufactured. by Toa Electronics).

Each of the control cream and samples 1, 2 and 3 was adjusted to its temperature to 10° C. and then put into a batch type churn to carry out formation of butter particles by churning. The operation time was around 45 minutes, and the thus obtained butter milk weight was about 10 kg and its milk fat content and fat-free milk solid content were 0.7% and 8.9%, respectively. These butter milk samples were subjected to heat sterilization at 95° C. for 15 seconds and then cooled down to 5° C.

These samples were subjected to the following tests.

By using the butter milk obtained from the control cream as a control, sensory evaluation of each of the thus obtained butter milk samples was carried out by paired difference test using a panel of 30 professionals who had a training for discriminating five tastes (sweetness, sourness, saltiness, bitterness and umami). Also, strength of oxidized smell of each butter milk sample was evaluated by scoring method by a panel of 5 professionals. These results are shown in FIG. 1 and Table 1.

TABLE 1

|  | Control butter milk | Sample 1 (8 ppm) | Sample 2 (5 ppm) | Sample 3 (2 ppm) |
| --- | --- | --- | --- | --- |
| Heat oxidized smell | 4.8 | 3.0 | 1.8 | 1.2 |

Evaluation points; 5: very strong, 4: strong, 3: slightly strong, 2: slight sensation, 1: no sensation At the same time, physical and chemical analysis of each butter milk sample was carried out.

The —SH group content was measured by a calorimetric determination in accordance with the method of M. Moka, E. M. Mikolajcik and I. A. Gould (*J. Dai. Sci.*, 51, 2, 217-219 (1968)).

DMS, DMDS and DMTS were measured using a GC/MS (gas chromatograph mass spectrometry) (HP6890 SERIES PLUS/HP5793 MSD; manufactured. by Hitachi Ltd.) by an HS/TCT (head space/thermal-desorption cold trapinjection) method.

Figure 2:
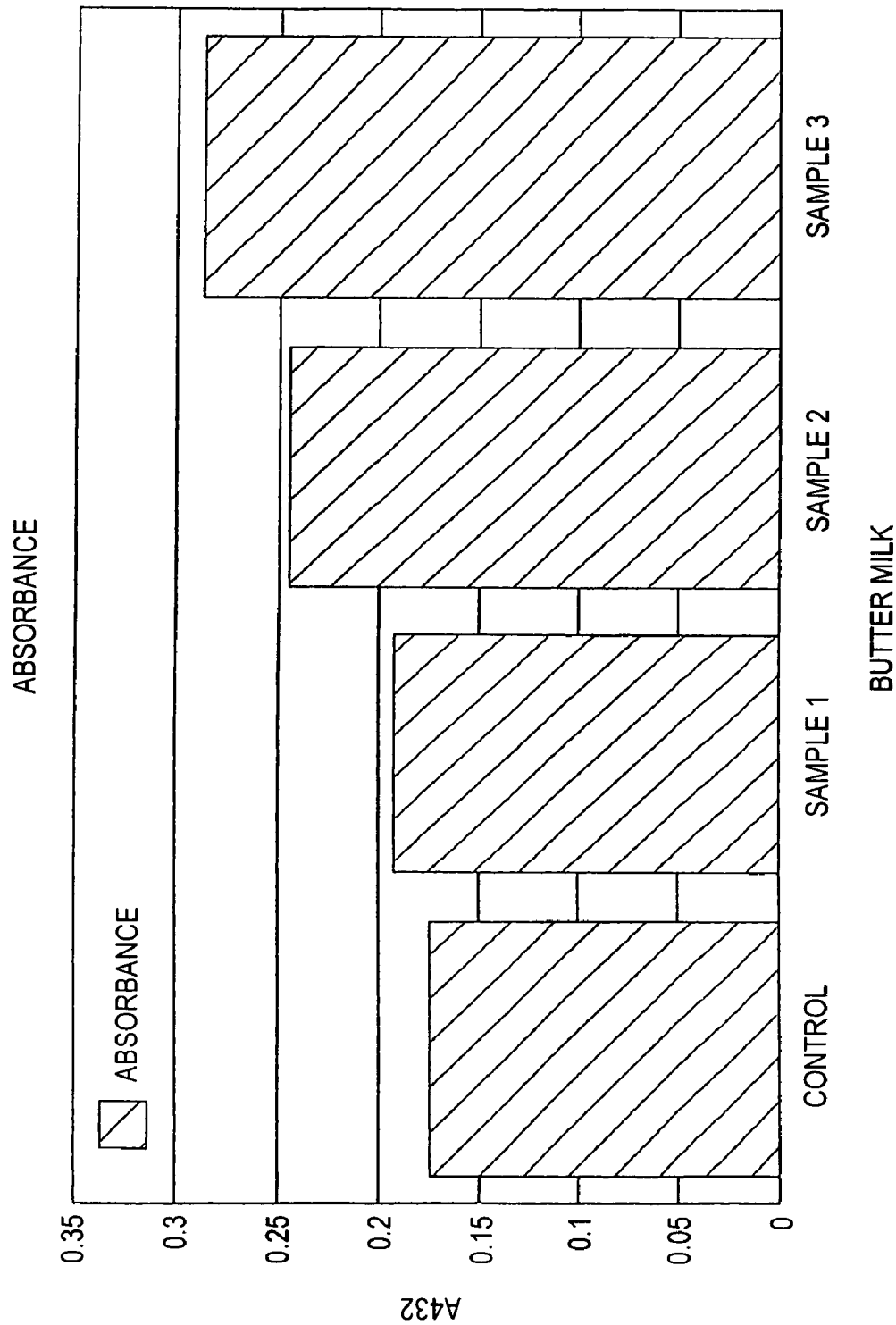
FIG. 2 is a graph showing a result of the measurement of the —SH group content in the above butter milk by a calorimetric determination (432 nm).
Figure 3:
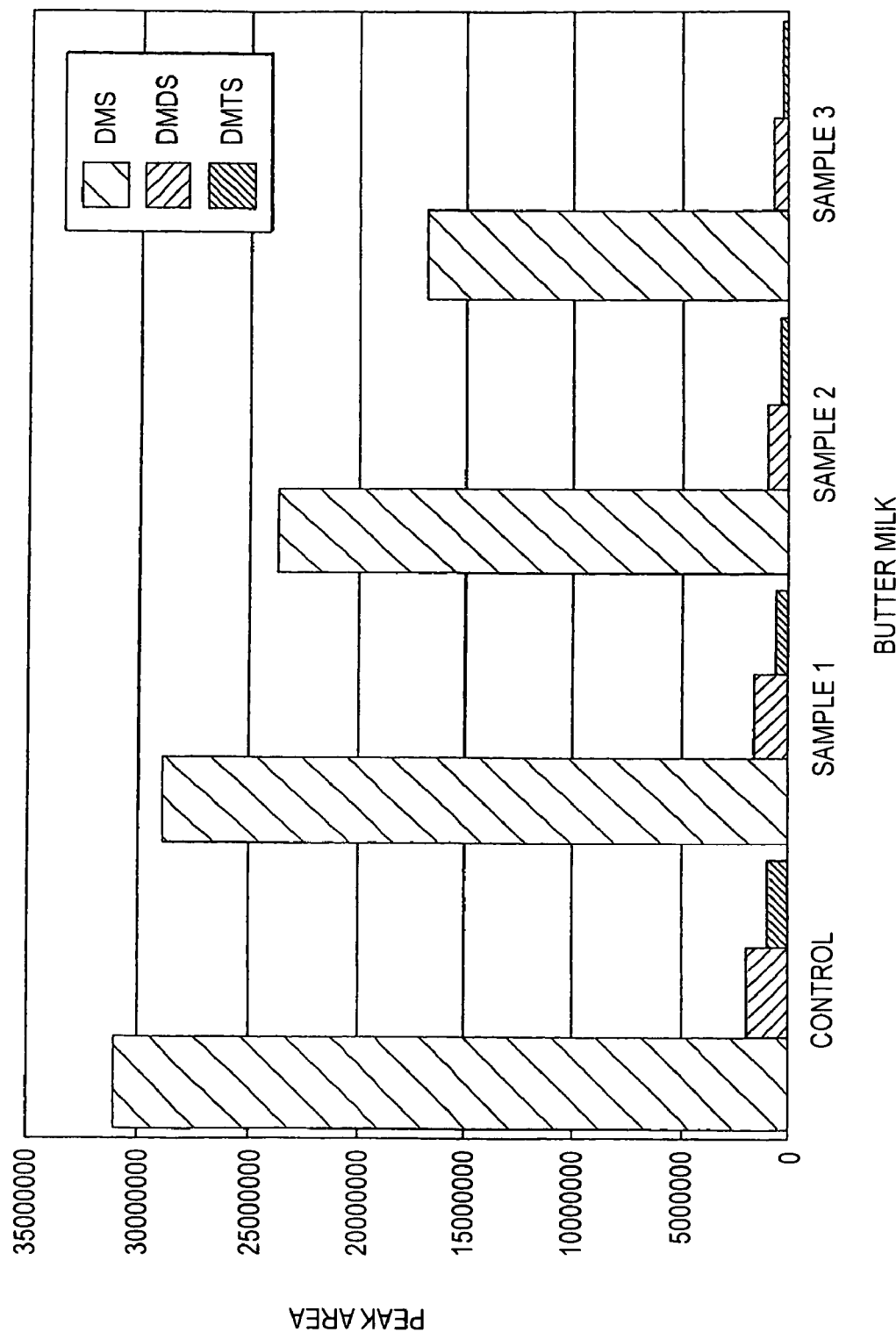
FIG. 3 is a graph showing a result of the measurement of DMS, DMDS and DMTS in the above butter milk.

Results of the analysis are shown in FIGS. 2 and 3.

As is apparent from the results shown in FIG. 1 and Table 1, as the dissolved oxygen in the cream was reduced, oxidized smell of butter milk became sensorially undistinguishable and, at the same time, expression of the raw milk-inherent sensory characteristics such as good taste, freshness, good throat-passing feeling, good after-taste and the like also became strong, so that the product became generally delicious in all these respects. This tendency became significantly distinguishable as the dissolved oxygen concentration became 5 ppm or less, and the oxidized smell was improved to a completely unfeeling level at 2 ppm.

Results of the physical and chemical analysis supported the above sensory evaluation results. That is, as the dissolved oxygen in the cream was reduced by nitrogen sealing, formation of radicalized lipid peroxides was inhibited and a large number of unreacted —SH groups remained as the result (FIG. 2). In addition, amounts of the sulfur compounds (DMS, DMDS and DMTS) as the final products were also reduced at the same time, thus confirming that the heating smell components were reduced (FIG. 3).

Example 2

Fresh cream was obtained in 300 kg by carrying out a heat sterilization at 95° C. for 15 seconds without sealing nitrogen gas in accordance with the method shown in Example 1. Next, 150 kg of butter milk was obtained using a batch type churn without carrying out nitrogen gas sealing. The composition was the same as in Example 1.

After 35 kg of the thus obtained butter milk was subjected to a heat sterilization at 95° C. for 15 seconds using the plate type sterilization testing machine at its temperature of 10° C. without sealing nitrogen gas, it was cooled to 5° C. The thus obtained butter milk weight was 20 kg (control).

In the same manner, 35 kg of the butter milk was taken out and at its temperature of 10° C., nitrogen gas was sealed in such an amount that dissolved oxygen became 8, 4 or 2 ppm. The mixture was immediately subjected to a heat sterilization at 95° C. for 15 seconds using the plate type sterilization testing machine and then cooled to 5° C. The thus obtained butter milk weight was 20 kg (samples 4, 5 and 6).

In the same manner as in Example 1, by using the nitrogen gas-unsealed butter milk as a control, sensory evaluation of each of the thus obtained butter milk samples was carried out by paired difference test using a panel of 30 professionals. Also, strength of oxidized smell of each butter milk sample was evaluated by scoring method by a panel of 5 professionals. These results are shown in FIG. 4 and Table 2.

TABLE 2

|  | Control butter milk | Sample 4 (8 ppm) | Sample 5 (5 ppm) | Sample 6 (2 ppm) |
| --- | --- | --- | --- | --- |
| Heat oxidized smell | 5.0 | 3.2 | 2.2 | 1.4 |

Figure 4:
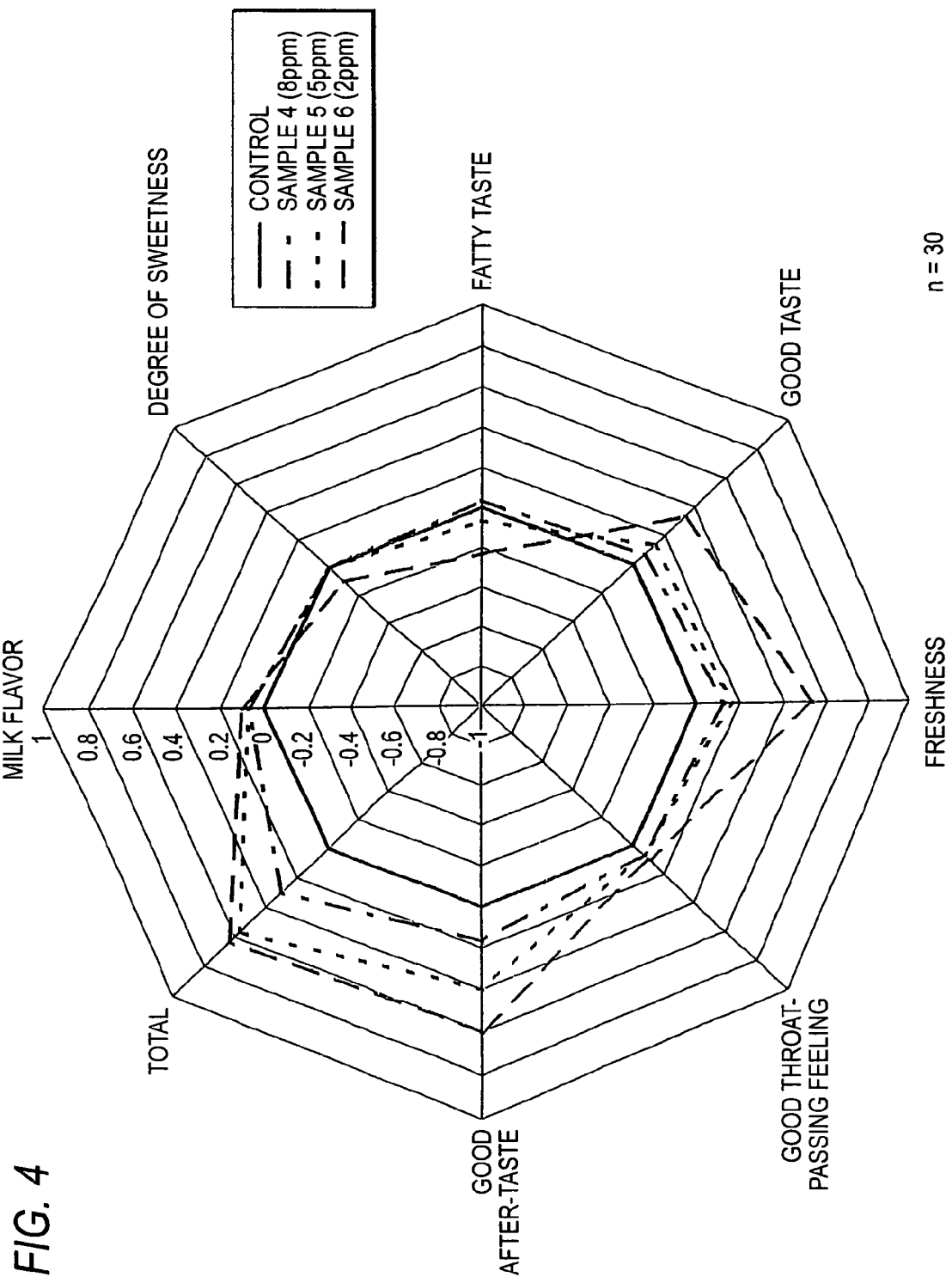
FIG. 4 is a graph showing a result of sensory evaluation of respective butter milks after heat sterilization of the butter milk obtained after heat-sterilizing them under the condition of reducing dissolved oxygen to 8, 5 or 2 ppm.

Evaluation points; 5: very strong, 4: strong, 3: slightly strong, 2: slight sensation, 1: no sensation As is apparent from the results shown in FIG. 4 and Table 2, as the dissolved oxygen in the butter milk was reduced, oxidized smell of the butter milk became sensorially undistinguishable and, and at the same time, expression of the raw milk-inherent sensory characteristics such as good taste, freshness, good throat-passing feeling, good after-taste and the like also became strong, so that the product became generally delicious in all these respects. This tendency became distinguishable at a dissolved oxygen concentration of 5 ppm or less, and the oxidized smell was improved to a hardly detectable level at 2 ppm. However, the thus obtained butter milk generated a strong oxidized smell though slightly, in comparison with its counterpart prepared in Example 1, so that the deoxidation operation by nitrogen sealing was more effective when carried out at an initial stage of the production process.

Example 3

Investigation was made on the addition of the present invention to food and drink. Each 250 g of a butter milk prepared from a fresh cream, in which nitrogen gas was not sealed or dissolved oxygen was reduced to 2 ppm, was put into a vacuum evaporator and concentrated until its solid matter increased four times. Next, 20 kg of the reduced milk (milk fat content 3.5%, fat-free milk solid content 8.3%) shown in Table 3 containing 0.3% of these butter milk concentrates was prepared. The reduced milk was emulsified using a homogenizer under a homogeneous pressure of 150 kg/cm$^2$, subjected to a heat sterilization at 130° C. for 2 seconds using the plate type sterilization testing machine and then immediately cooled down to 5° C. or less, thereby obtaining respective samples.

TABLE 3

| Reduced milk | Control | Nitrogen unsealed | Nitrogen sealed (2 ppm) |
| --- | --- | --- | --- |
| Salt-free butter | 4.1 | 4.1 | 4.1 |
| Skim milk powder | 8.5 | 8.5 | 8.5 |
| Four times concentrated butter milk |  | 0.3 |  |
| Four times concentrated butter milk (2 ppm) |  |  | 0.3 |
| Raw water | 87.4 | 87.1 | 87.1 |
| Total | 100.0 | 100.0 | 100.0 |

By using the butter milk with no additives made from reduced milk as a control, sensory evaluation of each of the thus obtained reduced milk samples was carried out by paired difference test using a panel of 30 professionals. Also, strength of oxidized smell of each sample was evaluated by scoring method by a panel of 5 professionals. These results are shown in FIG. 5 and Table 4.

TABLE 4

|  | Control | Nitrogen unsealed | Nitrogen sealed (2 ppm) |
| --- | --- | --- | --- |
| Heat oxidized smell | 1.0 | 2.4 | 1.2 |

Figure 5:
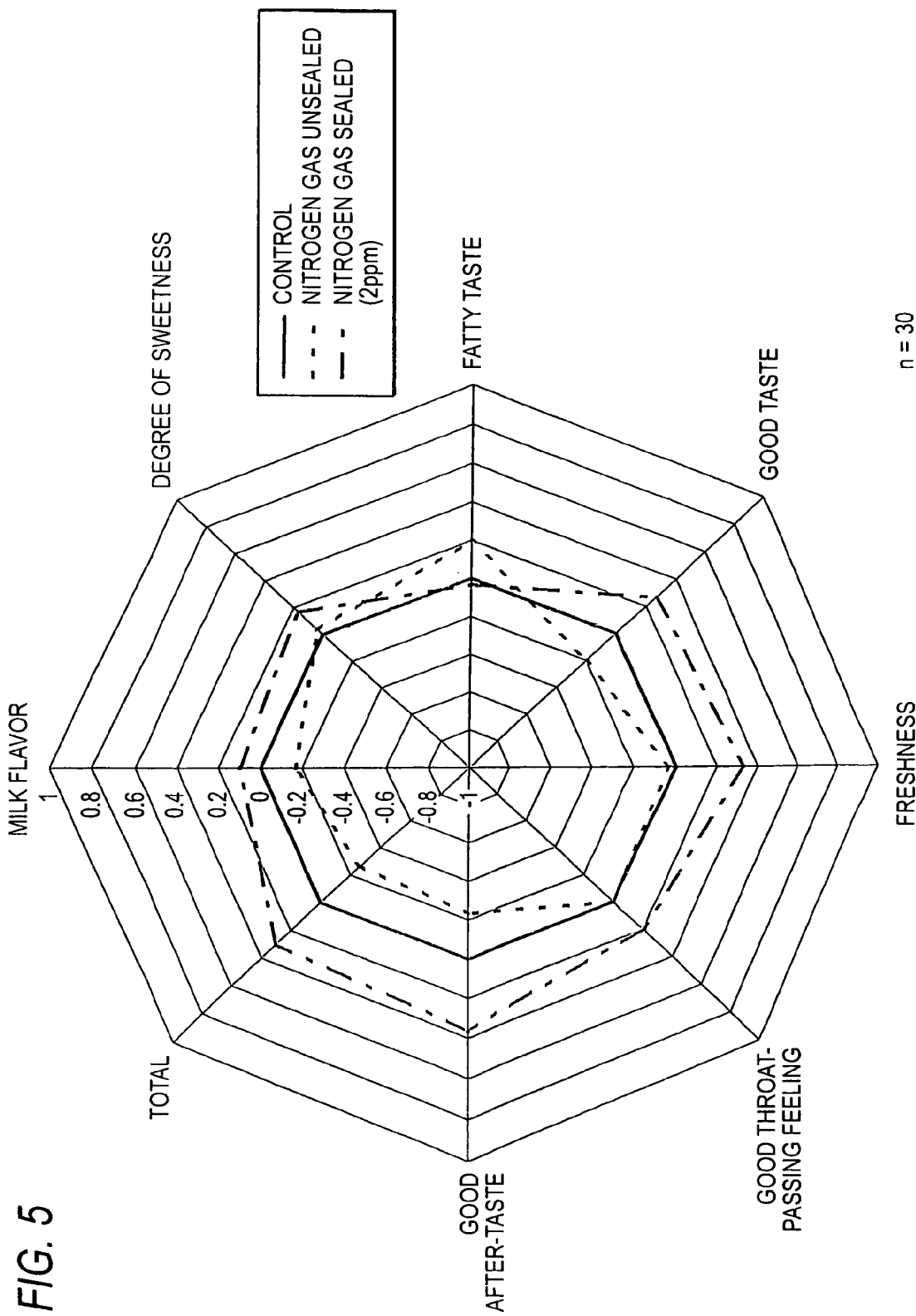
FIG. 5 is a graph showing a result of sensory evaluation of a reduced milk to which a butter milk concentrate (nitrogen-sealed heat sterilization or nitrogen-unsealed heat sterilization) was added or not added.

Evaluation points; 5: very strong, 4: strong, 3: slightly strong, 2: slight sensation, 1: no sensation As is apparent from the results shown in FIG. 5 and Table 4, it was pointed out that the milk to which the nitrogen-unsealed butter milk concentrate was added increased a fatty taste but generated a certain foul odor, so that butter milk concentrate was not necessarily evaluated as a flavor improving agent, but in the case of the butter milk concentrate whose dissolved oxygen was reduced to 2 ppm by carrying out nitrogen sealing, the raw milk-inherent sensory characteristics such as good taste, freshness, good throat-passing feeling, good after-taste and the like were strongly expressed in the milk too, so that the product was felt generally delicious in all these respects. Thus, it was confirmed that the oxidized smell generation-inhibitory effect and milky flavor improvement can be maintained by the present invention in the case of batter milk-related diary products, too.

INDUSTRIAL APPLICABILITY

According to the present invention, the milky flavor originally possessed by butter milk can be maintained and improved through the prevention of oxidized smell which is generated from batter milk-related diary products and processed milk products during their production by undergoing influence of oxidation based on the dissolution of oxygen in the air. Although the use of application of these butter milk-related diary products and processed milk products in the food industry was strictly restricted in so far, by the present invention, the extreme expansion of their use and the recycle of the entire amount of butter milk which had to be discarded in so far are possible, and therefore the reduction of risk of causing environmental pollution by the disuse can be achieved.

The invention claimed is:

1. A process for preparing butter milk and/or butter serum, which comprises:
   subjecting raw cream to a first heat treatment at 85° C. to 95° C.,
   preparing butter milk and/or butter serum by subjecting the raw cream to churning, and
   subjecting the butter milk and/or butter serum to a second heat treatment at 85° C. to 130° C.,
   wherein a dissolved oxygen concentration of the raw cream is decreased to 8 ppm or less by addition of an inactive gas before the first heat treatment to the raw cream, and/or a dissolved oxygen concentration of the butter milk and/or butter serum is decreased to 8 ppm or less by addition of an inactive gas before the second heat treatment to the butter milk and/or butter serum.

2. The process according to claim 1, wherein the addition of inactive gas is not conducted before the first heat treatment.

3. The process according to claim 2, wherein the addition of inactive gas is not conducted before the second heat treatment.

4. The process according to claim 1, wherein the dissolved oxygen concentration of the raw cream and/or butter milk and/or butter serum is decreased to 2 to 8 ppm by the addition of the inactive gas.

5. The process according to claim 1, wherein the dissolved oxygen concentration of the raw cream and/or butter milk and/or butter serum is decreased to 5 to 8 ppm by the addition of the inactive gas.

6. A process for preparing a butter milk-related dairy product and/or processed milk product, which comprises subjecting the butter milk and/or butter serum prepared by the process according to claim 1 to at least one processing selected from the group consisting of concentration, drying, fractionation, purification, deodorizing, decoloring and addition of an additive.

7. A process for preparing a milk product or processed milk product, which comprises adding at least one selected from the group consisting of the butter milk and butter serum prepared by the process according to any one of claims 1 to 3 to another milk and/or milk product.

8. A process for preparing food or drink, which comprises using, as an addition material, at least one selected from the group consisting of the butter milk and butter serum prepared by the process according to any one of claims 1 to 3.

* * * * *